(No Model.)
J. B. GRANT & A. MASON.
METHOD OF TREATING COTTON SEED AND ANALOGOUS OILS.
No. 331,702. Patented Dec. 1, 1885.
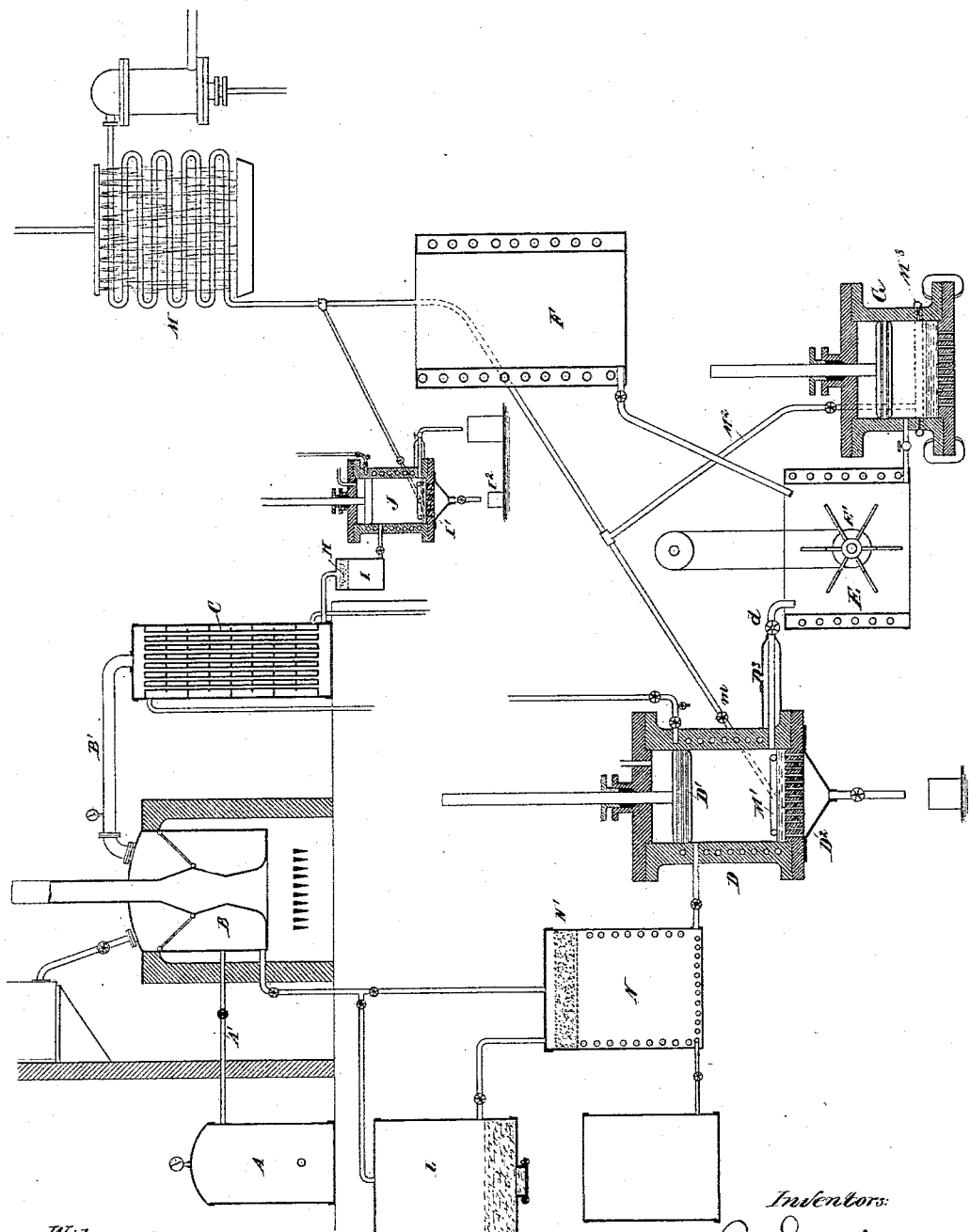
Witnesses:
Charles R. Searle,
L. P. Smith.
Inventors:
James B. Grant
Allen Mason
by their attorneys
Thomas Drew Stetson.

UNITED STATES PATENT OFFICE.

JAMES B. GRANT, OF NEW YORK, AND ALLAN MASON, OF BROOKLYN, N. Y.

METHOD OF TREATING COTTON-SEED AND ANALOGOUS OILS.

SPECIFICATION forming part of Letters Patent No. 331,702, dated December 1, 1885.

Application filed April 27, 1885. Serial No. 163,672. (No specimens.)

*To all whom it may concern:*

Be it known that we, JAMES B. GRANT, of the city and county of New York, in the State of New York, and ALLAN MASON, of the city of Brooklyn, in the county of Kings and State of New York, have invented certain new and useful Improvements in Methods of Treating Cotton-Seed Oil and Analogous Oils, of which the following is a specification.

The oil obtained in large quantities from cotton-seed has the property of rapidly absorbing oxygen and becoming rancid. We have discovered that it may be purified by partial distillation. We find that this oil, either alone or combined with another suitable oil, may, by a proper treatment, be brought to a condition in which it will keep for an indefinite period. We partially distill the oil, and thereby remove the most volatile portions to be utilized for purposes for which such lower-priced material may be adapted. We effect the condensation of the more volatile parts by long-approved means, exposing the vapor to metal surfaces in the form of pipes kept at a low temperature by the circulation of water. The oil remaining in the still is removed at intervals, and is by far the greatest and most valuable portion. This is afterward further treated with alkali and acid to precipitate certain impurities, which are then separated by decantation. It is next filtered through fuller's earth, animal-charcoal, or any other cleansing and purifying agent, and is then saturated with carbonic-acid gas. This gas is neutral and peculiarly beneficial for this purpose. The treatment produces a cotton-seed oil possessing the usual qualities of such oil, but better, by reason of its greatly-reduced tendency to absorb and combine with oxygen, and its freedom from unpleasant taste or smell. It is important that the partial distillation be effected and the remaining oil be saturated with carbonic-acid gas at ordinary temperature. For purposes where the fullest use of our invention is desired, this oil is afterward further treated by straining with pressure at a low temperature induced by the direct contact of expanded carbonic-acid gas. This separates it into an oil, which is fluid at all temperatures, and a hard fat. The hard fat is then mixed by strong mechanical agitation with beef-fat or mutton or other suitable animal-fats and immediately frozen. This so unites the fats that they ever after remain practically combined. Our treatment produces oil and hard fat possessing peculiarly valuable qualities. It is necessary to freeze the material at a very low temperature and then express the uncongealed portion. In the further treatment, to produce the superior product intended and desired by the combination of the stearine remaining after some portion of the oil has been expressed with animal oil or fat, it is necessary to thoroughly mix the product in proper proportions and freeze the mixture instantly.

The accompanying drawing forms a part of this specification, and is an elevation, partly in vertical section, of a set of apparatus adapted to carry out our invention.

Referring to the drawing and letters of reference thereon, A is a receiver filled with carbonic-acid gas which has been manufactured under pressure or has been compressed by pumps or otherwise to a tension sufficient to carry it into the still.

A' is a pipe controlled by a cock. It is used for delivering carbonic-acid gas from the receiver A to mingle with the vaporized oil in the still B, and to travel with it through the condenser C and the other portions of the apparatus.

B is a still of the form and character set forth in the United States Patent to one of us dated August 21, 1866, No. 57,311. The temperature may be 240° to 265° centigrade.

B' is a vapor-pipe leading the most volatile portion of the cotton-seed oil from the still B to a surface-condenser, C, adapted to produce efficient condensation.

The further treatment of the most volatile portion will be described further on.

We will proceed now to describe the treatment of material remaining in the still. It is drawn out by any practical means and refined, if necessary, by the usual treatment with acid and alkali in the tank I. It is then mechanically filtered at N'. It is next saturated by the direct application of carbonic-acid gas at ordinary temperature in the form of minute bubbles in the tank N. The carbonic-acid gas may be made practically pure in large quantities at a moderate cost by treating marbledust or limestone with sulphuric acid. The oil may be stored and sold for use in the condition which now obtains, and is greatly improved. It may be kept a long time, perhaps indefinitely, without becoming rancid.

When our invention is fully carried out, the oil is subjected to further treatment. To anticipate a little, we may say briefly that the oil is passed into a chamber where it can be exposed to a strong hydraulic pressure, with provisions, by straw or analogous material, for straining. In this space we freeze the oil by the direct contact of expanded carbonic-acid gas. The expanded and intensely cold gas may, like the similar gas at ordinary temperature before described, be admitted liberally into direct contact with the oil without producing any change, except to lower its temperature and to further complete the saturation, if it has not before been fully saturated. The refrigeration by this means is dry, rapid, and complete. The frozen oil is then subjected to a strong pressure to force out the uncongealed portion, which portion may be sold at a high price for table use or for other purposes requiring fine oil, while it will not congeal at any ordinary temperature, and is without scent or taste, and not liable to become rancid. The hard portions are suitable, either alone or mingled with animal-fat, for use in cooking. The carbonic-acid gas admitted to the oil has an action superior to that of ice, for the reason that no oxygen can be furnished by the gas. The carbonic-acid gas for the freezing is compressed by suitable pumps or is manufactured at a high pressure, and after the heat of compression has been removed by showering with cold water in a coil, M, is allowed to expand by flowing through a proper controlling cock or valve, $m$. The carbonic acid in the gaseous form, expanded and intensely cold, flows into the perforated pipe M′, near the bottom of the oil-chamber, and rising in minute bubbles rapidly cools the oil by its direct contact therewith.

D is the cylinder, and D′ the piston, of a hydraulic press. After the piston D′ is raised by any suitable means (not shown) and the chamber below is filled or nearly filled with oil and frozen, the pumps (not shown) are operated to depress the piston and induce a severe pressure on the oil. The thin portion exudes through the strainer D². Next admitting steam from a boiler (not shown) into a jacket surrounding the chamber D, and also into a discharge-pipe, D³, the hard fat is melted, and on opening the valve $d$ it is delivered as required into a mixing-vessel, E, where it is mixed with any desired proportion of animal oil or fat from a tank, F, and agitated by a revolving wheel, E′. This fat thus mixed with the cotton-seed fat may be melted beef-suet, mutton-tallow, lard, or other animal-fat adapted to impart any desired qualities which the purified and practically tasteless and scentless cotton-seed product above does not possess. After being thoroughly mixed, the mixed product is discharged into a tank, G, where it is again frozen by treatment with cold carbonic-acid gas received through the pipe M² into the perforated pipe M³ or other convenient distributing means, the cold carbonic-acid gas being received from the same source as before, or from a different source, as convenience may dictate. The fat mixed and instantly frozen under these conditions will remain permanently united, and may be put up in tierces or other large or small packages and stored or transported for use. Now, returning to the volatile material escaping as a vapor through the pipe B′. It is condensed and made to assume a liquid form by contact with extended metallic surfaces kept cold by water. This takes place in the condenser C. From this it is drawn through a filter, H, composed of animal-charcoal or fuller's earth, which removes the coloring-matter and other impurities into a storage-tank, I, from whence it is taken at intervals into a press, J, where it is frozen by the direct application of carbonic-acid gas from the same source, M, or from any other suitable source, and is subjected to strong compression under proper conditions to separate the liquid portion from the solid and semi-solid. The liquid portion is pressed through a strainer of straw or other material, I′, into a tank, I², from whence it may be taken as required for use. This remains fluid at all ordinary temperatures. Its handling requires no further care. It is an oil resembling the well-known red oil of commerce, but superior thereto. It is an oil well adapted for illumination and various purposes, but eminently serviceably in the treatment of wool for spinning and preparing for market. The hard portion remaining in the press is next melted and withdrawn. It is melted by heat applied through the steam-heating pipes. The melted fat is drawn out and stored in tierces or other convenient receptacles. This is stearine, suitable for candles and for other uses.

Modifications may be made in the forms and proportions of the details. We can vary the temperature and the pressure so as to extract more or less of the oil, and thus adapt the product to any climate. We can conduct the process so as to make three or more grades of products: first, a limpid oil which remains fluid at ordinary temperatures, but will congeal on being much cooled; second, a very limpid oil which will remain fluid at all practicable temperatures; third, a hard fat solid at all ordinary temperatures.

We can use fish-oil or porpoise-oil as the animal-oil for admixture.

We can produce the carbonic-acid gas by other means than those suggested.

Instead of the form of still represented, we can use any other approved or suitable construction which will present the heat moderately and uniformly to the oil, and effect thorough evaporation of its volatile material.

Part of the invention may be used without the whole.

When we use oil that has been refined by any method, we dispense with the tank L and precitating process, and pass the oil from the still B directly into the filter N' and tank N, from whence the process proceeds as described.

In lieu of introducing carbonic-acid gas, we can produce by any ordinary means a vacuum in the still, which will usually give the desired result.

We can use nitrogen gas in lieu of carbonic-acid gas, if expedient or necessary from any cause.

The process may be applied with some advantage to other oils and fats than those derived from cotton-seed oil. It is of advantage in treating any oil which is capable of being partially distilled and which is liable to become rancid. The freezing with carbonic-acid gas may be used with advantage in treating any fat which is to be used for food, whether distilled or not. The oil expressed by the press D will never freeze, unless the temperature is carried below that at which this treatment is conducted.

We claim as our invention—

1. The within-described process of treating cotton-seed oil or analogous quickly-decomposing oils, by partially distilling in the presence of carbonic-acid gas and then saturating with carbonic-acid gas, substantially as herein specified.

2. The process described of treating cotton-seed oil or analogous rapidly-oxidizing oils and fats, by partially distilling, saturating with carbonic-acid gas, freezing, separating the frozen from the parts remaining liquid, mixing other fat with the hard portion, and immediately freezing again, all substantially as herein specified.

3. The oil described, produced from cotton-seed or analogous source from which the most volatile portions have been removed by partial distillation and saturated with carbonic-acid gas at ordinary temperature, as herein specified.

4. The oil described, composed of oil from cotton-seed or analogous sources partially distilled, frozen, and pressed, as herein specified.

5. The product described, composed of hard fat or stearine from cotton-seed oil or analogous sources partially distilled, frozen, and pressed, as herein specified.

6. The product described, composed of volatile matter from cotton-seed oil or analogous sources distilled over, frozen, and pressed, as herein specified.

In testimony whereof we have hereunto set our hands, at New York city, in the presence of two subscribing witnesses.

JAS. B. GRANT.
ALLAN MASON.

Witnesses:
CHARLES R. SEARLE.
E. BROOKES.